Nov. 15, 1949  A. L. THURSTON  2,488,349
ELECTRIC WEIGHING APPARATUS
Filed June 10, 1944  3 Sheets-Sheet 1

INVENTOR.
ARTHUR L. THURSTON.
BY
Ward, Crosby & Neal
ATTORNEYS.

Nov. 15, 1949     A. L. THURSTON     2,488,349
ELECTRIC WEIGHING APPARATUS

Filed June 10, 1944     3 Sheets-Sheet 2

INVENTOR.
ARTHUR L. THURSTON.
BY
Ward, Crosby & Neal
ATTORNEYS.

Nov. 15, 1949     A. L. THURSTON     2,488,349
ELECTRIC WEIGHING APPARATUS
Filed June 10, 1944     3 Sheets-Sheet 3

INVENTOR.
ARTHUR L. THURSTON.
BY Ward, Crosby & Neal
ATTORNEYS.

Patented Nov. 15, 1949

2,488,349

UNITED STATES PATENT OFFICE 2,488,349

ELECTRIC WEIGHING APPARATUS

Arthur L. Thurston, Wantagh, N. Y., assignor to Cox & Stevens Aircraft Corporation, Mineola, N. Y., a corporation of New York Application June 10, 1944, Serial No. 539,658

12 Claims. (Cl. 201—63)

This invention relates to apparatus for measuring compression forces, being particularly adapted for weighing apparatus, among other possible uses.

In one of its presently preferred forms the invention may be embodied in a cell or capsule-like device adapted to be inserted between any suitable support and an object to be weighed. The cell embodies a plurality of strain gauges of the electrical resistance type, together with an arrangement of parts such that the strain variations indicated by these gauges are preferably directly proportional to weight variations to which the cell or capsule is subjected. For purposes of weighing airplanes, vehicles, etc., the device may for example be placed on top of a jack or any other support, in a position to receive the weight to be measured. For cases such as for platform scales, a plurality of the devices may be located at suitably spaced points to support the platform or other weight-receiving member.

Various suggestions have heretofore been made for the provision of some simple, accurate, relatively inexpensive and preferably portable apparatus for weighing planes, trucks, cars, etc., so as to avoid the use of the commonly available tyes of large, heavy, expensive and generally nonportable mechanical scales. Various hydraulic devices have been proposed, but in general such equipment has been found too bulky, cumbersome or inaccurate for general use for the purpose. Prior to this invention, efforts with devices using strain gauges of the above indicated type were unsuccessful because the results were not sufficiently accurate. However, the present invention provides a convenient arrangement making possible the use of such strain gauges for the purpose for a wide range of weights, up to many thousands of pounds, and with an accuracy within a small fraction of 1%. The cell or capsule-like device in which the strain gauges are contained may be either of a portable form, or adapted to be fixed in position and may for example be used in connection with any form of vehicle jack, and the necessary accessory equipment for measuring the electrical resistance variations in the strain gauges used may be convenietly carried from place to place in a suitcase, together with one or more of the cells, electrical connection wires and accessories therefor. Thus, relatively inexpensive equipment is provided which is easy to operate under a wide variety of conditions, such as where platform scales have previously been required or where no convenient form of accurate weighing apparatus has heretofore been available in practice. With the use of this invention, the usual deep pit heretofore required for platform scales is unnecessary.

According to the invention, a pair of spaced members are provided between which a plurality of columns are interposed, the strain gauges being carried by the columns at positions intermediate the two members. The weight of the load to be measured may be applied to one of said members, such weight being distributed among all of the columns and applied to the other member acting as a support. Heretofore dynamometers for compression forces have been proposed in the form of a pair of spaced members between which a single column is interposed carrying a strain gauge. However, extensive efforts to use such an arrangement as a weighing device, with a single large column, proved unsuccessful for general purposes, at least for weights of substantial amounts, since the variations indicated by the strain gauge did not accurately correspond to variations of the weight being measured. While the reasons for these inaccuracies which were serious and unpredictable, are not fully understood, it is believed that the strains effected in the load-receiving member followed different and peculiar patterns, depending upon each slight difference in the position and area to which the load was applied to the member. Consequently the pressure applied to different portions of the surface areas at the ends of the column would vary widely, without any predetermined relationship to the weight being measured, and the strains resulting in different portions of the column would likewise vary without any determinable relationship to the weight being measured. For instance, it is conceivable that portions of the column to which parts of the strain gauge might be applied, might at times be under tension to varying degrees, whereas other portions of the column might be under compression so that indications given by one portion of the strain gauge might in effect be subtracted in varying degrees from the results from another portion of the gauge. In any event, it was discovered that these difficulties could be eliminated by supporting the load-receiving member with a plurality of columns each carrying strain gauges and with the columns arranged in spaced relation around about the axis along which the load is applied to the load-receiving member.

Various further and more specific objects, features and advantages of the invention will clearly appear from the detailed description given below taken in connection with the accompanying drawings which form a part of this specification and illustrate by way of example several forms of the invention. The invention consists in such novel features and combinations of parts as may be shown and described in connection with the apparatus herein disclosed.

Referring to Figs. 1-4 in further detail, the device here shown may comprise a supporting base member as at 20 preferably formed of steel and having dimensions such that it will have considerable rigidity. Another member 21 at the top of the device is adapted to receive the weight of the load to be measured, this member being supported with respect to member 20, entirely by a plurality of spaced-apart columns as at 22a, 22b, etc., four of such columns being here shown by way of example, arranged with their vertical axes in uniformly spaced relation about the circumference of a circle, the circle being preferably concentric with a cavity 23 formed in the upper surface of the member 21. Member 21, as well as these columns, are also preferably formed of steel. The walls of the cup shaped cavity 23 are preferably formed as a surface of revolution, the axis of which is parallel to the axes of the columns, i. e., vertical, with the device in the position shown.

The member 20 is adapted to be placed upon any suitable support as at 24, which for example may comprise the top of a jack. As shown, member 24 may be formed with an integral, central, upstanding, threaded pin as at 25 adapted to be received in a correspondingly threaded aperture at the middle of member 20. To permit easy application of the device to pin 25, the lower portion of such aperture may be flared outwardly as at 26.

At the top of the device an adaptor member such as at 27 may be provided having a downwardly projecting boss as at 28, shaped to be received in the cavity 23. The shape of this boss is such that when an object to be weighed, such as at 29, rests upon member 27, the weight will be applied to the lower central area of the cavity 23, that is, to an area such that the weight will be approximately uniformly distributed onto the columns 22a, 22b, etc., thereby subjecting each column to a compressive stress, the total of such stresses accurately representing the weight to be measured.

In the form shown, the columns are all of uniform square cross section and strain gauges of the electrical resistance type (one example of which is disclosed in patent to E. E. Simmons, Jr., No. 2,316,203) are applied to the outer and inner column surfaces at areas intermediate the upper and lower ends thereof, these gauges being indicated as at 30a, 30b respectively. Such gauges together with certain compensating gauges and resistances hereinafter described, are adapted to be connected in a bridge type of circuit, which in turn may be connected through a detachable plug connection as at 31 to suitable electrical resistance measuring apparatus of available types which form no part of the present invention. Suitable connections for the electrical elements within the device of Figs. 1-4 will be described hereinafter.

The columns 22a, 22b, etc., may be secured at their lower ends to member 20 as by screws 32, which pass up through the member 20 and into threaded screw holes preferably formed as shown at the centers of the lower ends of the columns. The lower end surfaces of the columns and the upper surfaces of the member 20 which contact therewith, are accurately ground to conform to a plane preferably perpendicular to the axes of the columns. Also for reasons hereinafter more fully explained, it is preferable with each column before it is secured in place, to carefully lap its lower end surface with respect to the surface portions on member 20 with which it is to contact. This may be accomplished by applying a suitable lapping compound between the surfaces and then rotating each column on its retaining screw with its lower end surface firmly pressed against the member 20 at the area with which it is to contact in use.

After the columns are secured in position on the member 20, then the member 21 may be put in place to rest upon the top surfaces of the columns. It is important also that the lower surface of the member 21 and the top surfaces of the columns be also carefully made. That is, in this case the under surface of member 21 is preferably lapped simultaneously with respect to the top surfaces of all of the columns by applying a suitable lapping compound therebetween, then rotating member 21 about its vertical axis as it rests upon the columns under some pressure. Here also the surfaces which contact are preferably accurately ground along a plane perpendicular to the vertical axes of the columns.

The above described accurate grinding and lapping of the column end surfaces with respect to the members 20, 21 is desirable, since otherwise it has been found that the strains established in the columns at the areas of the strain gauges shown, may not vary accurately in accordance with variations in the weight being measured. It appears that if the weight as applied to each column is not uniformly distributed over the cross section of the column, as is made possible only by the accurate contact due to grinding and lapping, then the strain effects on the various gauges will be to a considerable extent unpredictable and the weight indications will be inaccurate to a prohibitive degree for most general purposes. While some of such inaccuracies might be satisfactorily taken into consideration by calibrating the device throughout the range of weights intended to be measured thereby, it is of course preferable to have the device in such form that in conjunction with the electrical measuring instruments used, direct readings may be obtained without reference to a calibration chart for each device, and this may be accomplished with the invention as herein disclosed. It should be further noted, however, that if the contacts with the column surfaces are not made accurately, serious inaccuracies may be encountered in using the device even in connection with a calibrated chart. These inaccuracies may be due to temperature changes affecting the location and extent of the actual contacting areas and/or due to minor differences in the position of the area within the cavity 23 at which the weight of the load is applied, thus variably affecting the distribution of the forces to the columns and the strain pattern at different points within each column.

The devices shown in Figs. 1–4 may be provided with a suitable cylindrical casing as at 33 having an internal flange 34 near its lower edge adapted to rest upon the periphery of member 20 and to be secured thereto as by a plurality of screws 35 passing up through the member 20 and through the flange 34 as shown. The upper edge of the casing 33 may be formed with a rigid internal flange structure as at 36 recessed as at 37 to receive a restraining ring or plate member 38 connected as by screw bolts 39 to the member 21. The purpose of the restraining ring or plate 38 as connected to the member 21 is as follows. In some cases the device may be placed hastily or carelessly for example on a jack in a position such that weight will be applied to the peripheral portions of the member 21 and thereby tend to tilt this member to such a pronounced degree that without some restraining means it might be tilted out of position or cause one of the columns to be permanently distorted or broken. However, with the construction shown, when such a tilting force is applied, it will be transmitted through one or more of the screws 39 to the restraining ring 38, which is then intended to apply upward pressure to the flange structure 36 of the casing. The casing in turn being of a quite rigid construction firmly secured to the member 20, it will be apparent that the tilting forces on the member 21 will be effectively resisted and consequently damage to the device will be prevented. In normal operation, the restraining ring 38 may be so positioned that it does not apply any pressure to the flange structure 36, and the member 21 will consequently be free to rest upon the columns without strains being introduced therein due to the presence of the restraining ring 38.

The casing 33 may be provided with a cover 40 having an annular flange 41 secured as by a plurality of rivets 42 to the upper edge of the casing. The outer annular horizontal surfaces of this cover as at 43 are made relatively thin to act in the maner of a diaphragm and consequently unable to transmit any very substantial force in vertical directions. These diaphragm areas as shown may be spaced slightly from the upper edge of the main body of the casing. The central portion of the cover 40, as at 44, as shown may be of relatively thicker material with its upper surface contacting with the lower surface of member 21 except that circular apertures as at 45 are provided for each of the columns 22a, 22b, etc. The periphery of the area 44 may be formed with a flange as at 46 received in a corresponding peripheral recess at the lower edges of member 21. Each of the screws 39 may be provided with nuts as at 47 normally positioned on the screws so as to press firmly against the under surface of cover 40 for acting in conjunction with screws 39 in retaining member 21 securely fixed on the cover. Screws 39 are also locked by nuts 47 in positions such that the retaining ring 38 is not pressed up against flange 36 until a tilting force is applied to the device as above explained. It is noted that the top corners of each of the columns may be cut away as at 48 to provide clearance within circular apertures 45.

Figure 1:
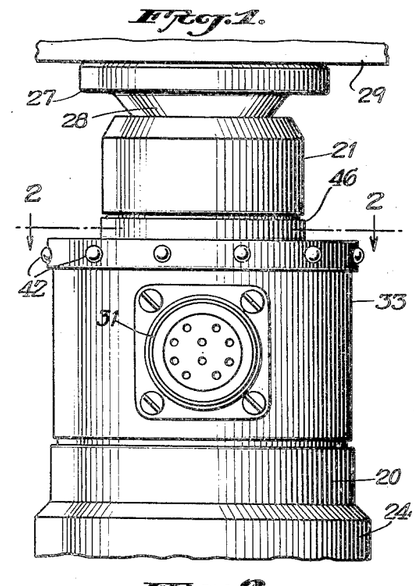
Fig. 1 is a side elevational view showing the exterior of one of the cells or capsules involving the invention.
Figure 2:
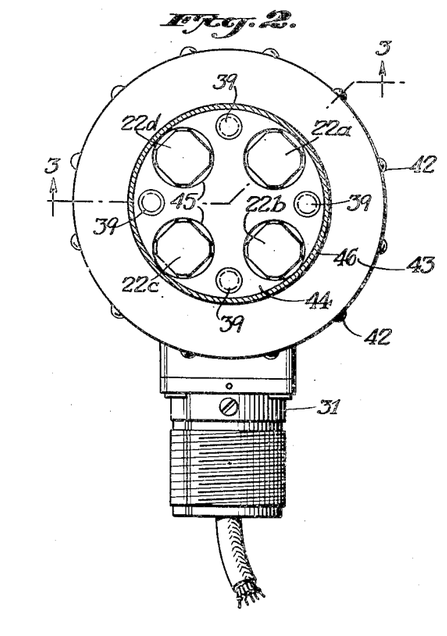
Fig. 2 is a sectional view taken substantially along line 2—2 of Fig. 1.
Figure 3:
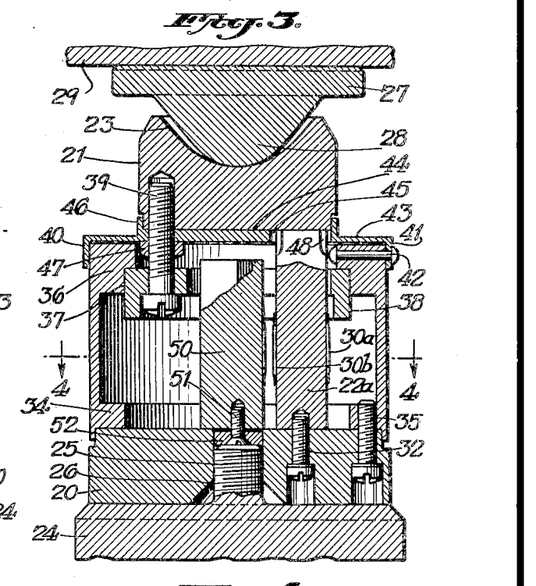
Fig. 3 is a vertical sectional view taken substantially along line 3—3 of Fig. 2.
Figure 4:
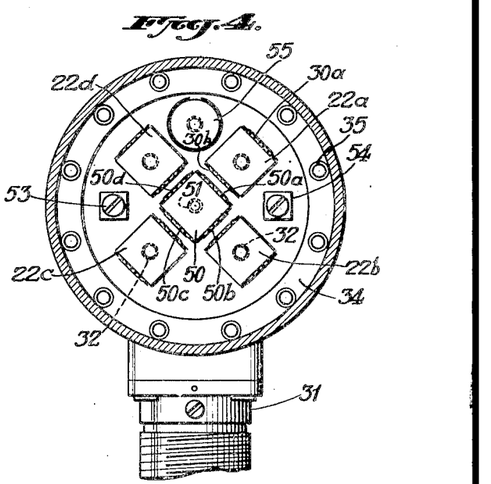
Fig. 4 is another sectional view taken substantially along line 4—4 of Fig. 3.

In the assembly as shown in Figs. 3 and 4, a central column 50 may be provided for carrying a number of "dummy" strain gauges as at 50a, 50b, etc. This column may be of the same material and of cross-sectional dimensions as large or larger than columns 22a, 22b, etc., and because of these facts and due to its central position, the dummy gauges carried thereby are well adapted for connection in such a manner as to compensate for temperature variations which cause strain variations affecting the main or active strain gauges. For substantially ideal conditions, the column carrying the dummy gauges should preferably be of a mass about equal to the total mass of the columns carrying the active gauges, so that during the use of the device the effect of any rise in temperature of the dummy column assembly will be about equal to that of the active column assembly. The space available for the dummy column in the construction of Figs. 1–4 is, however, quite limited so that in this form of the device the dummy column is shown of about the same mass as each single active column, but for many purposes the results are still found to be satisfactory. In the form of device hereinafter described in connection with Figs. 7 and 8, the space available between the columns is much greater. Accordingly the dummy column of the preferred larger mass may be there used.

Column 50 terminates as shown below the cover of the device and therefore carries no load, with the consequence that strain gauges 50a, 50b, etc., are subject only to temperature variations. The lower end of column 50 may be secured as by a screw 51 to a plug disc 52 received in the same aperture, into which the threaded securing pin 25 is received.

Suitable insulation posts as at 53, 54 and 55 as shown in Fig. 4 may be mounted on member 20 within the device at positions between the columns. These will serve to carry certain compensating resistances and terminal connections, etc., as hereinafter described.

Figure 11:
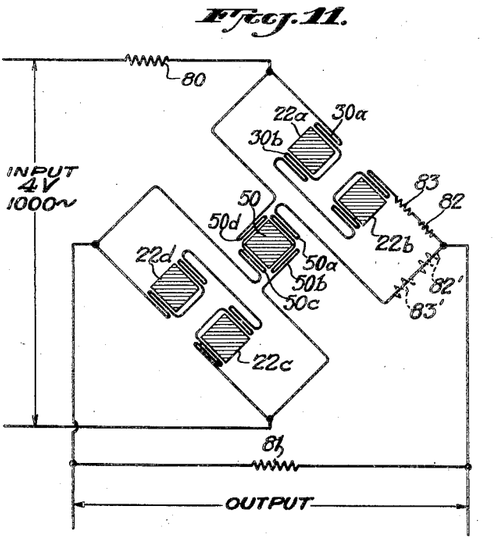
Fig. 11 is a diagram of electrical connections such as adapted for the arrangement of Figs. 1-4.

The wiring diagram of Fig. 11 illustrates how the strain gauges on the various columns of the device of Figs. 1–4 may be connected in a bridge circuit. Two corners of the bridge circuit shown are connected to an input potential indicated by way of example as being 4 volts at 1000 cycles. The other two corners of the bridge are connected as shown to the output, the output as above stated being adapted to be connected to suitable apparatus of known types for indicating small variations in the output potential resulting from the unbalancing of the bridge when the device is subjected to a load to be weighed. It is noted that the active strain gauges carried by the columns 22a and 22b may all be connected in series in one branch of the bridge, the active strain gauges carried by columns 22c and 22d being similarly connected in series in an opposite branch of the bridge. The intervening legs of the bridge respectively may include the dummy gauges 50a, 50b, and 50c, 50d, carried by column 50.

One of the input connections may include a series resistance 80 for purposes of compensating for changes in the modulus of elasticity of the columns due to temperature changes. This resistance has dimensions and a temperature coefficient, either negative or positive, depending upon the modulus of the steel or other metal used for the columns.

The circuit may be initially so designed that the voltage differences at the output connections will rise in proportion to but somewhat more rapidly than the strains occurring in the columns under load. To compensate for this, a resistance 81 may be connected across the output and having dimensions determined by trial for each particular device so that with the indicating equipment used, direct readings of the weights may be obtained.

As initially made, the branches of the bridge may not be in balance. To compensate for this, a balancing resistance such as at 82 may be inserted in one side of the bridge circuit and having sufficient resistance to bring the bridge into balance. This resistance should preferably have substantially a zero temperature coefficient. In some cases of course it may be found necessary to insert this resistance in the other side of the bridge as shown by dotted lines at 82'.

During the use of the device, its temperature may change either due to outside causes or due to the heating effect of the resistance of the strain gauges. In each particular device as built, these temperature changes may affect one side of the bridge more than the other, and to compensate for this, a temperature compensating resistance as at 83 (or as at 83') may be inserted in one side or the other of the bridge, its proper value being determined by trial with each device. This resistance may be formed for example of copper or other metal, whose temperature coefficient is accurately known.

Figures 5, 6, 7, 8:
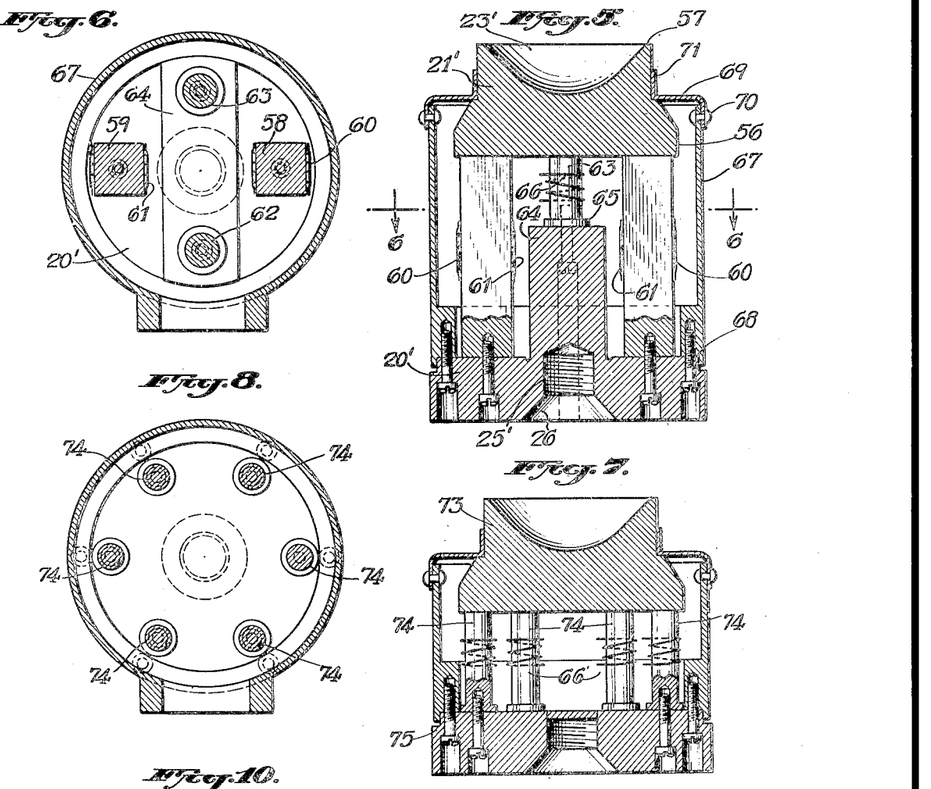
Figs. 5 and 6 are respectively vertical and horizontal sectional views of an alternative embodiment of the invention.
Figs. 7 and 8 are respectively vertical and horizontal sectional views of a further embodiment.

The embodiment shown in Figs. 5 and 6 is somewhat similar to that of Figs. 1–4, but here a weight-receiving member 21' is provided in such form that even though the weight may be applied to its upper periphery, the force will be distributed among the supporting columns to base member 20' without any tendency to tilt the member 21', and consequently no mechanism to restrain any such tilting is required. As shown, the lower portions of member 21' may be formed with an annular enlargement 56, the lower surfaces of which are adapted to be engaged by the upper surfaces of the columns in positions such that the center lines of the columns are all outside the upper outer rim 57 of the member 21'.

Two of the columns as at 58, 59 are shown as of square cross section with strain gauges as at 60, 61 applied thereto in the same manner as in Figs. 1–4. As shown, a pair of intervening columns of circular cross section may be provided as at 62, 63. These may be mounted on a diagonally positioned web portion 64 extending up from member 20' and integrally formed therewith. The lower ends of posts 62, 63 may be formed with flanges as at 65 so as to increase the area of contact with portion 64. As in Figs. 1–4, all of the posts may be secured by screws as shown to the base member, and as in the former case, the upper and lower surfaces of the columns should be carefully ground and lapped with respect to the surfaces with which same come into contact.

As best shown in Fig. 5, the columns of circular cross section may each be provided with a single strain gauge as at 66 in the form of a filament of suitably insulated wire which embraces the column and is therefore sensitive to the Poisson effect in the column when subjected to vertical stresses. This device may also be provided with a cylindrical casing 67 secured at its lower edge as by screws 68 to the base. An annular thin yieldable cover may be provided as at 69 having an outer depending flange 70 secured in any desired manner to the upper edges of the casing, and an inner upstanding flange 71 likewise secured in any desired manner to the side walls of member 21'. As in the case of Figs. 1–4, the flexible cover portions should be of such thinness as to be incapable of carrying any very substantial load in vertical directions and the cover flanges should be so secured with respect to the casing and to the load-receiving member that there will be no slipping and consequent frictional resistance variations due thereto. The cover member 69 thus provides means for preventing sidewise displacement of the member 21' and for retaining said member in a position such that its under surface as shown, normally bears against the top surfaces of the columns. The cover member 69 also closes off the casing against entrance of water or dirt, etc.

Figures 15, 16, 18:
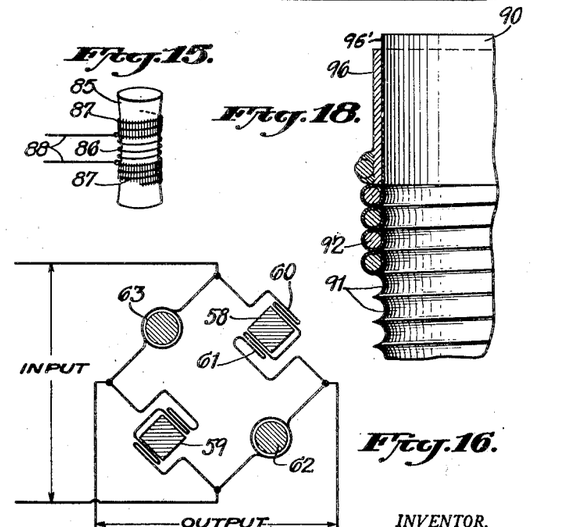
Figs. 15, 17 and 18 illustrate alternative forms of columns adapted for use in the devices of Figs. 1-9, inclusive, together with a strain gauge arrangement as applied thereto.
Fig. 16 is a diagram illustrating circuit connections for devices such as of Figs. 5 and 6.

The reasons for the particular construction of Figs. 5 and 6, and the operation thereof, will now be explained. If all of the four columns 58, 59, 62 and 63 were of the same length, then under well-known laws, the stress per unit area of cross section of all four columns would be equal if the deflections are equal, as will be the case if the members 20' and 21' are considered as substantially rigid members. And if the height of one of the columns is changed, the stress per unit area of cross section therein will change inversely with such change in height. Now, according to Poisson's ratio for structural steel, the strains to which a gauge embracing a column (such as at 66) will be subjected, will amount to about 0.303 times the direct compressive strains to which gauges will be subjected if positioned and arranged to indicate direct compressive strains (as are the gauges on columns 58 and 59). Hence, in order to increase the strains effective on gauges 66, to values equaling the strains effective on gauges of the types used on columns 58 and 59, the height of columns 62, 63 may be decreased by a factor of 0.303. For this reason columns 62 and 63 are preferably made of a height of about 0.303 times the height of columns 58 and 59 so that the two forms of gauges on the two forms of columns respectively will give substantially equal responses. The response from the gauges on columns 62, 63, however, will be in the opposite sense as compared with the response from gauges on columns 58 and 59. That is, on the one hand the strain gauge wire is stretched and its resistance increases as the load is applied, whereas on the other hand, the strain gauge wire is compressed and its resistance decreases when the load is applied to the device. Consequently as shown in Fig. 16 the gauges for the device of Figs. 5 and 6 may be placed in a simple form of bridge circuit, each side of which respectively includes gauges which respond in the opposite sense equally. That is, on one side of the bridge the gauges 60 and 61 carried by column 58 will form one leg of the bridge opposed to the gauge 66 carried by column 63. Similarly, the other side of the bridge may include the gauges carried by columns 59 and 62. This arrangement has a number of advantages. First, it will be noted that the plus and minus responses of the gauges are added, so that the differences in potential across the output will be twice as great for a given load, as with the arrangement of Fig. 11. Also, it will be noted in Fig. 16 that no dummy strain gauges for temperature compensation need be used with this arrangement. This is because the effects of variations in temperature on the strains affecting one type of gauge will be equal and the same as the effects of temperature variations on the strains affecting the other type of gauge. The circuit of Fig. 16 may include if desired, resistances such as at 80, 81, 82 and 83 of Fig. 11, but same have been omitted for simplicity in Fig. 16.

The embodiment of the invention shown in Figs. 7 and 8 is similar to that of Figs. 5 and 6 except that the load-receiving member 73 is supported by a plurality of columns as at 74, which are all of circular cross section, six of same being shown at equally spaced positions around a circle concentric with the member 73, the circle being of a diameter greater than the diameter of the exposed rim of the member 73, so that however the load may be applied to the latter member, it will be supported by the columns bearing against 75, without any tendency to tilt. Each of the columns 74 may be embraced by strain gauges 66′, similar to the gauges 66 of Fig. 5. In other respects the structure and operation of the device of Figs. 7 and 8 will be apparent from the foregoing descriptions of the previous embodiments.

Figure 9:
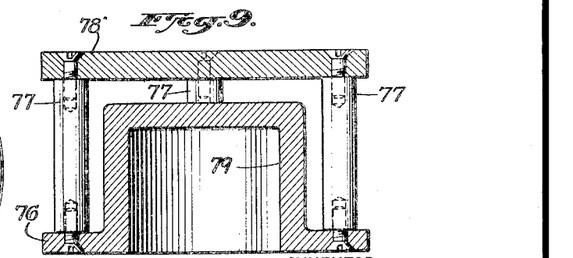
Figs. 9 and 10 are vertical and horizontal sectional views showing portions of a still further embodiment.
Figure 10:
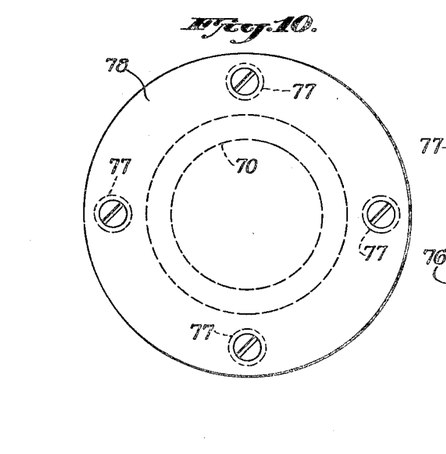

Figs. 9 and 10 illustrate another possible construction and arrangement of a supporting base as at 76 with which circular columns as at 77 are used for supporting a load-receiving plate 78, the columns being adapted to be associated with strain gauges as in previous embodiments and being secured to the upper and lower members in any suitable way as by screws as shown. The lower member 76 as here shown may be formed with a large central cavity 79 adapted to receive the upper portion of any suitable form of supporting post upon which it may be desired to affix or removably mount the structure.

In Fig. 15 an alternative form of supporting column and strain gauge arrangement is shown. This form of column may be used in lieu of the columns in the devices hereinabove described and is applicable for other general purposes wherever compression forces are to be indicated by strain gauges. The form of column 85 as shown is preferably of circular cross section, the cross section being of a diameter which gradually decreases from each end toward the middle portion. Preferably each element of the side walls of this column is arcuate, the radius of the arc being determined in a manner which will now be explained in connection with the theory according to which this type of column is believed to operate with a strain gauge as at 86 operating on the basis of the Poisson effect.

Figure 12:
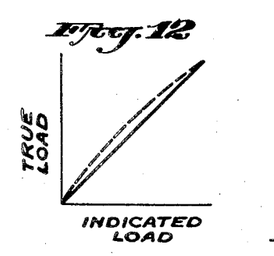
Figs. 12, 13 and 14 are diagrams for illustrating certain explanations of features of the invention.
Figure 13:
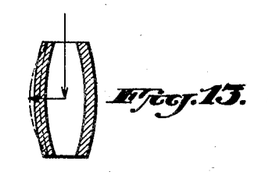
Figure 14:
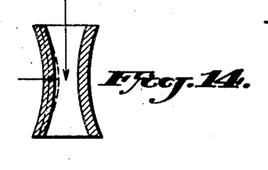

When plain cylindrical columns are used with strain gauges as in Fig. 7 of the type involving the use of Poisson's ratio, it has been found that the strains indicated as compared with the actual compressive stresses on the column, do not vary accurately according to a straight line as desired and as indicated by the full line shown at 45° in the diagram of Fig. 12. Instead, on parts of the curve, the strains indicated tend to be too great, as generally indicated (to an exaggerated degree) by the dotted line in this figure. It is believed that the reason for this is due to facts which will now be explained in connection with Figs. 13 and 14. If we take a hollow column, the walls of which normally bulge outwardly at the middle as shown in Fig. 13, and if a compressive force is applied as indicated by the vertical arrow, then there will obviously be a bending moment of force acting on the middle wall portions of the column in a direction indicated by the horizontal arrow, and tending to cause the center line of the wall section to be displaced outwardly as shown (to an exaggerated degree) by the outer dotted line in Fig. 13. This bending moment and the consequent displacement outwardly of the wall section, would obviously cause a strain gauge embracing the column to be expanded to a greater extent than would normally be expected merely from Poisson's ratio. For clearness of explanation, I have shown this effect on a barrel-shaped hollow column in Fig. 13, but a comparable effect is believed to occur with cylindrical solid columns. On the other hand, if we assume a hollow column having walls bulging inwardly at the middle as shown in Fig. 14, then upon application of a compressive force as indicated by the vertical arrow, the center line of the wall section of the column will tend to be displaced inwardly due to the moment of force acting in the direction of the horizontal arrow. Thus, in this case if a strain gauge is embracing the middle of the column, its response under compressive loads on the column will be substantially less than indicated by Poisson's ratio. That is, the bending moment here is in a direction to decrease the diameter of the middle of the column and hence decrease the Poisson effect. It has been found possible by properly proportioning the shape of the column, as in Fig. 15, to give any desired curvature to the curve of True vs. Indicated load, as in Fig. 12. It is not always possible to design the indicating unit to have a linear relationship between the output voltage of the cell and the indicated load reading. By proper selection of column shape it can be matched to the indicator so that the resultant curve of True vs. Indicated load will be a straight line. With the particular example of Fig. 15 which has given a satisfactory straight line response, the column was made of solid structural steel with the following dimensions:

| | Inches |
|---|---|
| Height | 1 |
| Diameter at top and bottom | ⅜ |
| Diameter at middle | 0.312 |
| Approximate radius of the arc of each element of the side wall | 4 |

For columns of other sizes and materials the proper dimensions may be determined by trial or by computations.

The strain gauge 86 of Fig. 15 may comprise a helical winding of suitable insulated resistance wire with its convolutions held firmly against the column by the use of suitable adhesive bonding material as at 87 applied to several of the end turns of the winding; the active convolutions which are connected in series with the terminals 88 may or may not be suitably bonded to the column. The strain gauges 66 and 66' as above referred to may be made in like manner.

Figure 17:
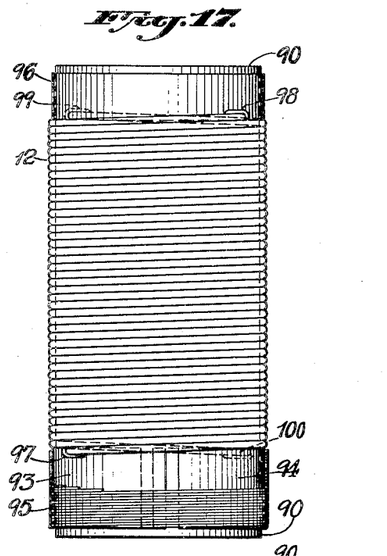

Fig. 17 is an enlarged side elevational view of an alternative form of column 90 which may be used in any of the hereinabove described devices. The side walls of this column are preferably threaded as at 91 (Fig. 18) to receive numerous turns of resistance wire 92, thus providing a strain gauge closely embracing the column and sensitive to the Poisson effect. The thread 91 is preferably cut with a cross section closely corresponding to the cross section of the resistance wire. In the form shown, the resistance wire may be insulated, for example, by an enamel coating and is of circular cross section, and accordingly the thread 91 is cut with an arcuate cross section of the same radius as that of the insulated resistance wire whereby nearly 180° of the cross section of the resistance wire is firmly supported in the thread.

In the particular form shown in Figs. 17 and 18, the resistance turns are wound non-inductively, that is, in fact a double thread is cut in the column surface for receiving two coils, the terminals of which are soldered respectively as at 97, 98 and 99, 100 to metal collar members 93, 94 and 96. In applying these collar members, the ends of the column may first be coated with a layer of suitable insulation varnish or the like, as indicated at 96', the collar 96 being then firmly shrunk on at the position shown. The members 93, 94 form in effect a split collar, the halves of which may be applied to an insulating varnish layer at the end of the column and held in place for example by numerous turns of cotton or linen thread as at 95. From Fig. 17 it will be apparent that the members 93 and 94 respectively may form the electrical terminals of the non-inductively wound type of strain gauge. It will be understood that if desired, only a single winding may be used in which case collars such as at 96 at each end of the column would form the electrical terminals of the strain gauge.

While the invention has been described in detail with respect to certain preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. In weighing apparatus, an assembly comprising a supporting member, a plurality of spaced-apart columns each having one end surface abutting said member, another member, one surface of which abuts the surfaces at the other ends of said columns, the side surfaces of said columns being free of any contact with said members, an opposite surface of the latter member having an area for receiving the weight to be measured at a position to so distribute such weight to said columns that variations in the total of the resulting strains effected in the portions of said columns intermediate said members are proportional to variations of such weight, when the parts are stressed within their elastic limits, and electrical resistance type strain gauge means bonded upon the surfaces of each of said columns at positions thereon intermediate said members and adapted for connection to resistance measuring apparatus for determining variations of said total.

2. In weighing apparatus, an assembly comprising a supporting member, a plurality of spaced-apart columns of uniform length each having one end surface abutting a uniform flat surface on said member, another member, having a uniform flat surface which abuts the surfaces at the other ends of said columns, an opposite surface of the latter member having an area for receiving the weight to be measured at a position to approximately equally distribute such weight among said columns, and electrical resistance type strain gauge means associated with each of said columns at positions thereon intermediate said members and adapted for connection to resistance measuring apparatus for determining variations of the total of the strains effected in the columns due to the weight being measured.

3. Apparatus for measuring compression forces, comprising an assembly including two spaced members and a plurality of columns interposed therebetween with their end surfaces uniformly abutting said members whereby such columns are stressed in proportion to compression forces applied to said members in directions longitudinally of the columns, electrical resistance type strain gauge means bonded upon the side surfaces of each of said columns and adapted for connection to resistance measuring apparatus to determine the strains in said columns resulting from such stressing.

4. Apparatus for measuring compression forces, comprising an assembly including two spaced members and a plurality of columns interposed therebetween whereby such columns are stressed in proportion to compression forces applied to said members in directions longitudinally of the columns, electrical resistance type strain gauge means associated with each of said columns and adapted for connection to resistance measuring apparatus to determine the strains in said columns resulting from such stressing, one of said members forming a substantially rigid supporting base and the other a substantially rigid load-receiving element formed on its upper surface with a socket in which the load is adapted to be applied, the center line of said socket being in a generally central position with the longitudinal axes of said column arranged at equally spaced positions around on a circle, the center of which is on such center line, the parts thus being so constructed and arranged that the several columns are stressed substantially equally by loads applied concentrically of said socket.

5. In apparatus for measuring compression forces, an assembly comprising a substantially rigid supporting member, a plurality of spaced-apart columns each having one end surface bearing against said member, another substantially rigid member, one surface of which bears against the surfaces at the other ends of said columns, and an opposite surface of the latter member having an area for receiving a load to be measured at a position to distribute such load among said columns, electrical resistance type strain gauge means associated with each of said columns at positions thereon intermediate said members and adapted for connection to resistance measuring apparatus for determining variations of the total of the strains in said columns, said columns being so positioned that their longitudinal axes are arranged around outside the perimeter of said load-receiving area, whereby said second-named member is supported against being tilted out of place on the columns when loads are applied at or adjacent such perimeter.

6. Apparatus for measuring forces, comprising an assembly including two spaced members, and a plurality of columns interposed therebetween for receiving loads applied to said members in directions longitudinally of the columns, and electrical resistance type strain gauge means associated with each of said columns, the gauges on certain of the columns being arranged to be sensitive to direct longitudinal strains in the columns, the gauges on others of the columns being arranged to be sensitive to the Poisson effect, the last-named columns being substantially shorter than the remaining columns whereby the deflections of the shorter columns will be greater and the Poisson effect therein correspondingly increased.

7. Apparatus for measuring forces, comprising an assembly including two spaced members, and a plurality of steel columns interposed therebetween for receiving loads applied to said members in directions longitudinally of the columns, and electrical resistance type strain gauge means associated with each of said columns, the gauges on certain of the columns being arranged to be sensitive to direct longitudinal strains in the columns, the gauges of others of the columns being arranged to be sensitive to the Poisson effect, the last-named columns being of a length in the neighborhood of 0.3 times the length of the other columns whereby the strains to which both sets of gauges are subjected will be of similar magnitude.

8. Apparatus for measuring compression forces, comprising an assembly including two spaced members and column means interposed therebetween whereby such column means is stressed in longitudinal directions as a result of compression forces applied to said members, electrical resistance type strain gauge means associated with said column means and adapted for connection to resistance measuring apparatus to determine the strains in the column means, and a casing surrounding the space between said spaced members and affixed at one end to one of said members, the opposite end of said casing having affixed thereto a cover portion which is flexible in directions longitudinal of the column means and extends inwardly to the other of said spaced members, central areas of said cover portion being rigid and affixed to said last named member, such cover portion acting to retain said last named member in a position bearing against said column means.

9. Apparatus for measuring compression forces, comprising an assembly including a substantially rigid base member and a substantially rigid load-receiving member spaced thereabove, stress receiving means interposed between said members, electrical resistance type strain gage means associated with said stress receiving means and adapted for connection to resistance-measuring apparatus to determine the strains in the stress receiving means, said load-receiving member being formed with a peripheral flange, an annular cover portion for the assembly having an internal flange overlying said peripheral flange, said cover portion being flexible in vertical directions, a casing surrounding the space between said spaced members, the upper edges of said casing being fixed to the periphery or said cover portion, and screw means for interconnecting the lower edges of said casing with said base member, said screw means being constructed and arranged to draw the casing and attached cover portion downwardly whereby the flanged cover portion acts to retain said load-receiving member in a position bearing against said stress receiving means.

10. Apparatus for measuring compression forces, comprising an assembly including a substantially rigid base member and a substantially rigid load-receiving member spaced thereabove, column means interposed between said members whereby such column means is stressed in longitudinal directions as a result of compression forces applied to said members, a cover for the assembly, said cover being flexible in vertical directions, a casing surrounding the space between said spaced members, the upper edges of said casing being fixed to the peripheral portion of said cover, and screw means for interconnecting the lower edges of said casing with said base member, said screw means being constructed and arranged to draw the casing and attached cover downwardly whereby the flexible cover retains said load-receiving member in a position bearing against said column means, means for retaining the base portions of said column means in fixed relation to said base member, and strain gage means mounted within said casing and responsive to strains resulting from said forces.

11. Apparatus for measuring compression forces, comprising an assembly including two spaced members and a plurality of columns interposed therebetween whereby such columns are stressed in longitudinal directions as a result of compression forces applied to said members, said columns being arranged at spaced points about a generally central space, electrical resistance type strain gage means associated with said columns and adapted for connection to resistance-measuring apparatus to determine the strains in the columns, a dummy column so positioned in said central space as to not be subject to compression forces applied to said members, and dummy electrical resistance type strain gage means associated with said dummy column and adapted for connection to the resistance-measuring apparatus to compensate for temperature variations affecting the first-named strain gage means.

12. Apparatus for measuring compression forces, comprising an assembly including a substantially rigid base member and a substantially rigid load-receiving member spaced thereabove, stress receiving means interposed between said members, electrical resistance type strain gage means associated with said stress receiving means and adapted for connection to resistance-measuring apparatus to determine the strains in the stress receiving means, said load-receiving member being formed around the periphery of its lower portion with an annular enlargement, an annular cover for the assembly having its internal edge portion overlying said annular enlargement to retain said load-receiving member down against said stress receiving means, said cover being flexible in vertical directions, a casing surrounding the space between said spaced members, the upper edges of said casing being fixed to the periphery of said cover, and screw means for interconnecting the lower edges of said casing with said base member.

ARTHUR L. THURSTON.

REFERENCES CITED

The following references are of record in the file of this patent:

UNITED STATES PATENTS

| Number | Name | Date |
|---|---|---|
| 566,698 | Raab | Aug. 25, 1896 |
| 1,435,603 | Hanser | Nov. 14, 1922 |
| 1,865,446 | Sears | July 5, 1932 |
| 1,972,578 | Wallichs | Sept. 4, 1934 |
| 2,050,106 | Lorig | Aug. 4, 1936 |
| 2,090,188 | Dahlstrom | Aug. 17, 1937 |
| 2,252,464 | Kearns | Aug. 12, 1941 |
| 2,322,319 | Ruge | June 22, 1943 |
| 2,336,500 | Osterberg | Dec. 14, 1943 |
| 2,360,886 | Osterberg | Oct. 24, 1944 |
| 2,362,589 | Simmons | Nov. 14, 1944 |

FOREIGN PATENTS

| Number | Country | Date |
|---|---|---|
| 658,570 | Germany | Apr. 6, 1938 |